United States Patent
Gavit et al.

(10) Patent No.: US 7,099,120 B2
(45) Date of Patent: Aug. 29, 2006

(54) METHOD FOR SUPPORTING A TAPE HEAD ASSEMBLY ON AN AIR CUSHION

(75) Inventors: Stephan E. Gavit, deceased, late of Littleton, CO (US); by Sharon Richardson, legal representative, Littleton, CO (US); by Donald Weinstock, legal representative, Littleton, CO (US); Christopher D. Goldsmith, Littleton, CO (US)

(73) Assignee: Segway Systems, LLC, Littleton, CO (US)

( * ) Notice: Subject to any disclaimer, the term of this patent is extended or adjusted under 35 U.S.C. 154(b) by 0 days.

(21) Appl. No.: 11/158,818

(22) Filed: Jun. 21, 2005

(65) Prior Publication Data

US 2006/0007596 A1    Jan. 12, 2006

Related U.S. Application Data

(62) Division of application No. 10/428,312, filed on May 2, 2003, now Pat. No. 6,909,581.

(51) Int. Cl.
G11B 5/584 (2006.01)
G11B 21/24 (2006.01)

(52) U.S. Cl. .................................... 360/291
(58) Field of Classification Search ............. 360/291, 360/290, 231, 230, 221, 129
See application file for complete search history.

(56) References Cited

U.S. PATENT DOCUMENTS

| | | | |
|---|---|---|---|
| 3,971,496 A | 7/1976 | Karsh | 226/3 |
| 5,224,641 A | 7/1993 | Spicer | 242/615.12 |
| 5,310,107 A | 5/1994 | Todd et al. | 242/615.1 |
| 5,777,823 A | 7/1998 | Gavit | 360/130.21 |
| 2004/0042689 A1* | 3/2004 | Wasson et al. | 384/12 |

FOREIGN PATENT DOCUMENTS

| EP | 0 570 853 A2 | 11/1993 |
|---|---|---|
| GB | 1 600 918 | 10/1981 |

* cited by examiner

*Primary Examiner*—Julie Anne Watko
(74) *Attorney, Agent, or Firm*—Timothy J. Martin; Michael R. Henson; John W. Carpenter

(57) ABSTRACT

A method of supporting a transducer head in a read/write application provides an air bearing member that has a bearing surface area. The transducer is reciprocally supported on the air bearing member. Gas is flowed out of the bearing surface area so that the transducer floats on a resulting air cushion. The transducer is then reciprocated in a controlled manner while floating. The method may be accomplished by mounting the transducer on a carriage and floatably supporting the carriage on the air bearing member. The bearing member and the carriage may be keyed to one another, and the bearing member may be formed of porous material. Reciprocation of the bearing member may be accomplished electromagnetically. The transducer may be used to read or write data on a tape medium.

18 Claims, 5 Drawing Sheets

METHOD FOR SUPPORTING A TAPE HEAD ASSEMBLY ON AN AIR CUSHION

FIELD OF THE INVENTION

The present invention generally relates to tape transport apparatus of the type employed in the data storage industry. More particularly, the present invention is directed to a tape head assembly adapted for use in such a tape drive apparatus. The present invention specifically concerns a method of supporting the transducer on an air cushion.

BACKGROUND OF THE INVENTION

The present invention continues the development of a read/write recording apparatus for the data storage industry which development includes various components and assemblies described in the earlier issued patents and applications of which the applicant is the named inventor or co-inventor. These include U.S. Pat. No. 5,737,153 issued Apr. 7, 1998 directed to a positioning assembly for recording heads and electronic recording devices. In U.S. Pat. No. 5,777,823, a tape transport apparatus is described that incorporates porous air bearings, and this air bearing technology is extended in U.S. patent application Ser. No. 10/111,728, now U.S. Pat. No. 6,722,608 which claimed the priority of PCT/US99/25421 (published as WO 01/31648). Additional technologies for an overall system are identified in U.S. Pat. No. 6,078,478 and in U.S. patent application Ser. No. 10/486,492. now U.S. Pat. No. 6,876,512 which claimed the priority of PCT/US02/25037 (WO 03/015087).

As discussed in the background of the above-referenced patents and applications, the advent of the information age has experienced substantial growth in both the accumulation and storage of data for online usage as well as for archival purposes. While magnetic disc and optical storage systems have been developed to increase the density of data that can be stored and while other storage devices are contemplated, magnetic tape remains a highly desirable format. This is especially true where the ability to rapidly access the data is of less significance and cost is of concern. Magnetic tape is still desirable since it has a relative low cost and can be easily erased and rewritten.

Magnetic tape is typically stored for use in a cassette form. Here, a spool of tape is contained within a housing. When placed on a read/write recording apparatus, a lead end of the tape is advanced across bearings to a take-up reel, and a read/write transducer is located adjacent to the tape in this path. Tape may then be spooled onto the take-up reel and unspooled back into the cassette so that the tape advances in a transport direction across the transducer.

The density of data that can be stored is dependant upon the number of "tracks" which can independently be placed across the width of the tape. Given a standard tape width, data density can increase by increasing the number of tracks. Thus, absent other factors, for data density to increase, the track width must decrease so that a larger number of tracks can be placed on a tape of given width. Currently, tape cassettes have about a four inch reel of tape that is about one-half inch wide. Approximately 320 tracks are placed across the width of the tape. Thus the track width is about twenty-five microns.

At the time of submitting this application, there are various goals in the tape storage industry to increase the storage capacity of a single four inch diameter magnetic tape cassette at least into the range of several terabytes. To accomplish this, track width must be reduced at least by an order of magnitude. While data density is a concern, it is still necessary to access the data quickly and accurately. Typical tape speeds are approximately twelve meters per second across a transducer. Thus, the difficulty of reading a large number of tracks of very narrow track width accurately as such transport speeds becomes a critical issue in this development project.

As should be appreciated by the ordinarily skilled person in this field, it is necessary that the tape head assembly that carries the transducer be highly responsive and controllable. As a tape is transported, deviations in track positioning can result from various conditions. Predominate among these is lateral drift of the tape from a datum reference which can result from tape guide problems, tape flutter, staggerwind on the take-up reel, to name a few. Regardless of the source of the deviation, it is necessary that the transducer maintain an accurate position relative to the tracks at all times. This requires the use of a tape head that can dynamically adjust to tracking deviations with extremely rapid response.

The response time of the tape head is naturally dependent upon the forces which resist the response. Two major forces which can contribute to the response time are the inertia mass of the moving portion of the tape head assembly and frictions inherent in the system that resist such movement. This problem is compounded since the tape head assembly must reciprocate to follow a tape track as the track deviates in either of the two lateral directions. Thus, it is necessary that the movement of the tape head assembly in one direction must be able to be quickly arrested and reversed into the opposite direction at a very high cycle rate.

Current tape head assemblies used in commercial applications employ a carriage that supports a transducer with the carriage mounted on and supported by a guide for translational motion. Typically, these guides are elongated cylinders made, for example, of a ceramic material. Mechanical roller bearings are typically formed as one or more skates which travel along the guide. Such tape head assemblies are marketed, for example, by the Hewlett-Packard Company and by Storage Technology Corporation.

The tape head assemblies noted above can typically weigh between eight and fifteen grams and contain numerous parts. This weight and the various moments of inertia and frictions associated with the mechanical bearings place a limit on the response time of these tape drive heads such that the ability to employ existing tape drive assemblies for use with tape cartridges in terabyte range is questionable. Moreover, these tape head assemblies are expensive to produce and may be subject to costly repairs should a breakdown in the tape head assembly occur.

Accordingly, there is an increasing need in this industry for improved tape head assemblies which may be employed with read/write equipment. There is a need to reduce the complexity of the parts and manufacture of tape head assemblies. There is still a further need for such tape head assemblies that have a minimum mass and which can exhibit extremely fast response times. The present invention is directed to meeting these needs.

SUMMARY OF THE INVENTION

One aspect achieved by the exemplary embodiments of the present disclosure is a new and useful method of supporting a transducer that may be used in read/write recording operations.

Another aspect achieved by the exemplary embodiments of the present disclosure is the support of a transducer wherein the tape head assembly has a rapid response time so that it may accurately follow a tape track of extremely small bits and rapidly adjust to the deviations in that tracking path.

Still a further aspect of the exemplary embodiments is a new and useful method of and assembly for supporting a transducer relative to a tape medium so that the transducer may act reliably, accurately and quickly follow a data track on a tape medium subjected to a read/write function of the transducer.

Yet a further aspect of the exemplary embodiments is to provide a method of supporting a tape head in such manner so as to accurately follow a tape track that is substantially narrower than existing technologies.

The present disclosure concerns a transducer head assembly that is adapted for use in a read/write application. As such, this disclosure teaches a method of supporting a transducer head assembly and a method of transferring data between the tape medium and a transducer head assembly in a read/write application. Broadly, the method of supporting a transducer head assembly that is adapted for use in a read write application includes a step of providing an air bearing member having a bearing surface area. A transducer is then supported on the air-bearing member in a manner such that it can reciprocate with respect to the bearing surface area. The method described according to the exemplary embodiment flows a gas out of the bearing surface area so that the transducer is floatably supported on a resulting air cushion. The transducer is then reciprocated in a controlled manner while the transducer is floatably supporting on the air cushion.

In the exemplary embodiments, the step of supporting the transducer on the air-bearing member is accomplished by disposing the transducer on a carriage. This carriage is then floatably supported on the air cushion. The step of reciprocating the transducer is then accomplished by reciprocating the carriage. In further detail, the exemplary embodiment includes configuring the air bearing and the carriage such they are keyed with respect to one another so as to resist relative rotation while being reciprocated. Here, in the exemplary embodiment, the air bearing member is formed generally in the shape of a prism having a cross-section the shape of a polygon with n-sides wherein n is an integer greater than 2 and wherein the carriage has a cross-section in a shape that is generally geometrically similar to and slightly larger than the cross-section of the polygon. The carriage may include a frame extending around a majority of the air bearing and, in the disclosed embodiment, the frame extends completely around the air bearing.

The air bearing is disclosed to be a porous ceramic air-bearing member which in the exemplary embodiment, has a plurality of sides. Thus, the bearing surface includes a plurality of sides of the air-bearing member. The step of reciprocating the transducer is accomplished electromagnetically. Here, an electromagnetic coil is mechanically secured to the transducer, such as by securing it to the carriage.

The method of supporting a transducer head assembly may be used in a read/write application, then, where a tape medium is transported across a transducer region in a transport direction such that the tape medium is proximate to the transducer. The transducer is then used to either write data on the tape medium or to read data from the tape medium as it is transported across the transducer region. The transducer is reciprocated along the translational axis that, in the disclosed embodiment, is oriented generally transversely to the transport direction of the tape medium.

In the disclosed embodiments, the structure of the transducer head assembly includes an air bearing member that is adapted to be placed in fluid communication with a source of pressurized air when in an active state. The air bearing member has a bearing surface area from which air is emitted when in the active state. A carriage is then supported on the air bearing member such that, when the air bearing member is in the active state, an air cushion is created between the bearing surface and the carriage. In this manner, the carriage floats for reciprocal movement along the translational axis relative to the air bearing member. A transducer is disposed on the carriage member, and a drive is operative to reciprocate the carriage. In the exemplary embodiment, the drive that reciprocates the carriage is provided by a magnet and electromagnetic coil.

In the exemplary embodiment, at least a portion of the air bearing member that provides the bearing surface is constructed of a porous material. However, it is desirable that the entire air bearing member be constructed of a porous material. This porous material may be selected from a group consisting of ceramics, metals and composite materials. The porous material may be a ceramic material impregnated with a selective adhesive. In the exemplary embodiments, the porous material is selected to be alumina. This porous material may be two percent to fifty percent open.

The air bearing member has at least one air distribution cavity formed therein. This can be a single large plenum that forms a hollow interior for the air bearing member. Thus, the air bearing member is formed as a shell having a sidewall surrounding a longitudinal extending plenum. Alternatively, the air bearing member can have a plurality of air distribution cavities formed as a plurality of generally parallel, elongated bores. Where a plurality of air diffusion cavities are provided, a manifold is used and is in fluid communication with the source of pressurized air and with the bores. In this manner, the manifold distributes pressurized air to the bores so that it may be ejected from the bearing surface area. The manifold may be formed in the air bearing member, itself, such as by a channel, or maybe formed in a base or a spacer or other support for the air bearing member.

The air bearing member can have any desired geometry, for example, the air bearing member may be formed generally in the shape of prism having a cross-section in the shape of a polygon with n sides wherein n is an integer greater than 2. In any event, the carriage and the air bearing member should be keyed with respect to one another thereby to prevent relative rotation above the translational axis. Where the air bearing member is formed as a polygon, the carriage can include a frame extending a majority of the distance around the air bearing. In the exemplary embodiments, the frame extends completely around the air bearing.

According to one embodiment, a multiple transducer tape head assembly is constructed. Here, at least two air bearing members are adapted to be placed in fluid communication with the source of pressurized air when in an active state. Each has a bearing surface area from which air is emitted in the active state. Each bearing member has a carriage supporter for reciprocal movement so that when the air bearing member is in the active state the air cushion is created between the bearing surface and the respective carriage so that each carriage floats for reciprocal movement. A transducer is then disposed on each of the carriage members. These transducers can be oriented in closely spaced, parallel relation and translate along parallel translational axis.

DETAILED DESCRIPTION OF THE EXEMPLARY EMBODIMENTS

The present invention broadly concerns the transfer of information between a transducer and a storage medium wherein the transducer is operative to either implant data on the medium, read data residing on the medium or to perform a combination of these features. Thus, as used in this application, the term "read/write" should be understood to cover read operations, write operations or a combination of read/write operations. Moreover, while the present invention is described with respect to the transfer of information between a read/write transducer and a magnetic tape medium, it should be understood that this invention is not limited to just this application. Indeed, the present invention may provide a head assembly that can carry a transducer of any type presently known or hereinafter developed and can include by way of example, but not limitation, magnetic read/write operations, optical read/write applications and the like.

Still further, while the present invention is directed to read/write operations with respect to a tape medium, whether it be magnetic or optical, it should be understood that the structure of the head assembly of the present invention might also be extended to disc storage devices or other devices where it is desired to support a transducer relative to a medium and extremely accurately control the positioning of the transducer relative to a recorded track on the medium. Therefore, the present invention is not to be read as being limited in any way to simply magnetic tape applications; however, this invention will be described with respect to such application for ease of understanding.

Figures 1, 2, 3:
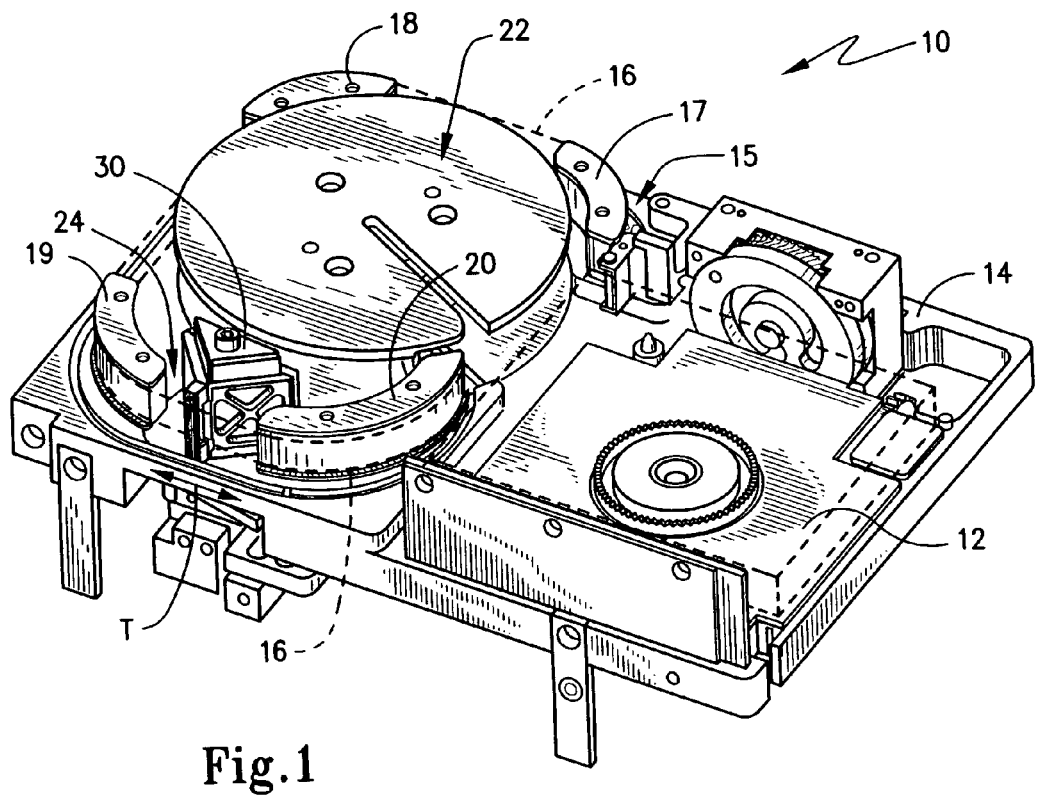
FIG. 1 is a perspective view of a tape transport apparatus incorporating a tape head assembly according to a first exemplary embodiment of the present invention.
FIG. 2 is a front view in perspective showing the tape head assembly according to the first exemplary embodiment of the present invention.
FIG. 3 is a perspective view showing the rear of the tape head assembly in FIG. 1.

Turning, then, to FIG. 1, a tape transport apparatus 10 is illustrated and is adapted to receive a cassette or cartridge 12 (shown in phantom) that contains a supply of a tape medium. Cartridge 12 rests in a docking station, and tape 16 (shown in phantom) is withdrawn from cassette 12 and is threaded around a plurality of bearings such as bearings 17, 18, 19 and 20. Tape 16 is then collected in a take up assembly illustrated as reel 22.

While this structure is generally known in the art, the tape drive apparatus 10 illustrated in FIG. 1 is subject various ones of my existing patents and co-pending applications. By way of background, these include U.S. Pat. No. 5,777,823 and U.S. patent application Ser. No. 10/111,728, now U.S. Pat. No. 6,722,608, which claimed the priority of PCT/US99/25421 (published as WO 01/31648) which are specifically incorporated herein by reference. This patent and the application describe a tape transport apparatus that incorporates these porous air bearings. Additional technologies for my overall system are identified in U.S. patent application Ser. No. 10/486,492, now U.S. Pat. No. 6,876,512 which claimed the priority of PCT/US02/25037 (WO 03/015087), the disclosure of which is incorporated herein by reference.

In any event, returning to FIG. 1, it may be seen that tape 16 may be transported forward and backward in a transport direction "T". A transducer head assembly 30 according to a first exemplary embodiment of this invention is disposed in a transport region 24 that is located between bearings 19 and 20 so that the transducer, discussed below, is proximate to tape 16 during the transport operation. Air bearings 17 and 18 are provided so that tape 16 can be threaded from cassette 12 around air bearings 17–20 to take-up assembly 22, as is known in the art and is driven by a suitable motor drive, as is also known. Take up assembly 22 can also be of the type described in copending U.S. patent application Ser. No. 10/189,813, the disclosure of which is hereby incorporated by reference. A tape threading assembly 15 of any type known in the art can perform the threading operation, and a representative tape threading assembly according to this design is shown in U.S. patent application Ser. No. 10,189,881, now U.S. Pat. No. 6,814,324, the disclosure of which is hereby incorporated by reference.

The exemplary embodiments of present invention, however, are directed to a transducer head assembly that may generally be used with any type of tape read/write apparatus in addition to that apparatus shown in FIG. 1, so that the exact structure of the tape read/write apparatus, such as those set forth above, is in not essential for an understanding of this invention. Transducer head assembly 30 is introduced in FIGS. 2 and 3. Here, it may be seen that transducer head assembly 30 includes an air bearing 32 that is rigidly supported on a base 34. Here, it should be understood that base 34 can be an independent base or can actually be a portion of support framework 14 without departing from the scope of this invention. Accordingly, it should be understood that reference to base 34 could be interpreted as reference to a region of support framework 14 proximate to transport region 24. Further, it should be understood that the term "air" is generally understood to be referring to atmospheric air but, for purposes of this application, it could be any gaseous material that may be injected into air bearing 32 to create the air cushion, as described more thoroughly below.

In any event, transducer head assembly 30 also includes a carriage 36 that is disposed on air bearing 32 for reciprocal movement in a translational direction "X" which, with reference to FIG. 1, may be seen to be transverse to the transport direction "T" of tape 16. Carriage 36 includes a frame 38, and it may be seen that transducer 40 is supported on frame 38 for reciprocal translation in the direction of arrow "X".

An electromagnetic drive is provided for carriage 36 with the fundamentals of this electromagnetic drive being well known in the art. As illustrated in FIG. 3, base 34 supports a cylindrically shaped, upright permanent magnet 42 thereon. Carriage 36 mountably supports an electromagnetic coil 44 which is telescopically received on cylindrical magnet 42. As is known, changes in the electrical current flowing through coil 44 will interact with the magnetic field of magnet 42 so as to translate carriage 36 and transducer 40 during a read/write operation.

Figure 4:
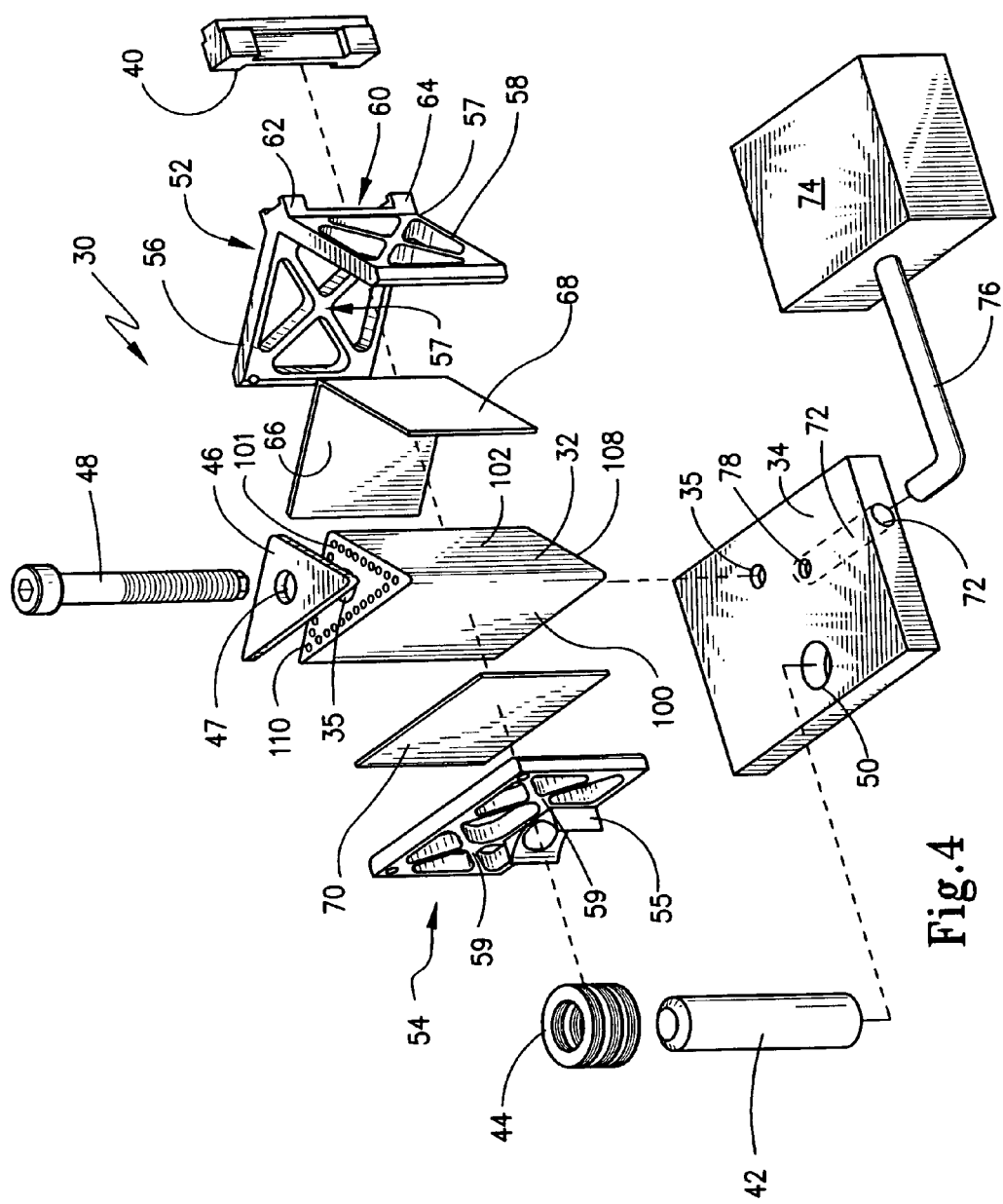
FIG. 4 is an exploded view of the tape head assembly of FIGS. 2 and 3.

The structure and construction of transducer head assembly 30 is shown in increased detail in FIG. 4. Here, it may be seen that air bearing 32 is mounted to base 34 by means of a top cover plate 46 and a mounting screw 48. Mounting screw 48 extends through a central opening 47 formed in cover plate 46 and through a central bore 33 that extends through air bearing 32. Screw 48 is then mounted in threaded opening 35 formed in base 34. Magnet 42 is received in opening 50 and is secured relative to base 34 in any convenient manner known in the art.

Carriage 36 may be seen in FIG. 4 to be constructed of a first carriage piece 52 and a second piece 54. First carriage piece 52 includes a pair of wings 56 and 58 that are formed at right angles to one another and are machined with high precision at a 90 degree angle. Carriage piece 52 is also shown to include a cradle 60 formed by supports 62 and 64 for transducer 40. Second carriage piece 54 includes a bracket 55 that supports coil 44. Carriage 36 also includes a plurality of glide plates secured thereto. For example, a glide plate 66 is secured to wing 56, and glide plate 68 is secured to wing 58 and a glide plate 70 is secured to carriage piece 54. Carriage pieces 52 and 54 may be constructed of any suitable lightweight material, such as magnesium, thermosetting plastics, fiber filled plastics, composites and the like.

As discussed more thoroughly below, air bearing 32 is preferably formed of a porous ceramic material, however, any suitable air bearing may be employed with the transducer head assembly according to this invention. Thus, for example, it may be possible to use existing metal air bearings having air bearing surfaces drilled with a plurality of outlet ports to create an air bearing surface. In any event, it is necessary to supply air bearing 32 with a source of pressurized air (or other gas). To this end, base 34 includes an inlet passageway 72 that is connectable to a source of pressurized air 74 by means of a suitable conduit 76. Passageway 72 has an outlet port 78 so that air from source 74 may be ejected out of outlet 78 for introduction into air bearing 32.

Figure 5:
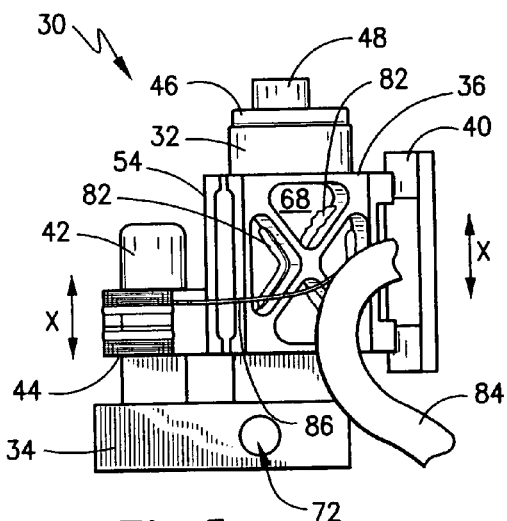
FIG. 5 is a side view in elevation showing the tape head assembly of FIGS. 2 and 3 showing electrical interconnection therewith.
Figure 6:
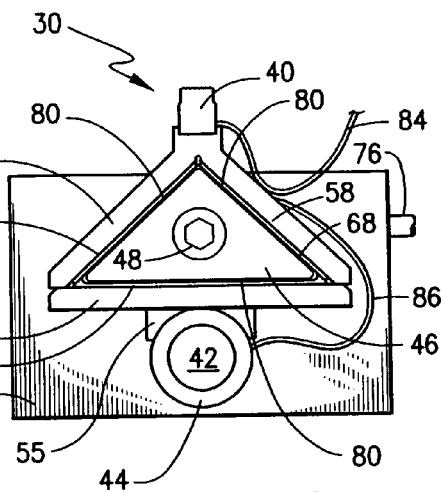
FIG. 6 is a top plan view of the tape head assembly of FIG. 5.

Transducer head assembly 30 is shown assembled in FIGS. 5 and 6 where it may be seen that carriage 36 is telescopically received on air bearing member 32 for reciprocal motion in the direction of arrow "X". The surfaces of air bearing member 32 provide a bearing surface from which air is emitted when pressurized air is supplied through inlet passageway 32. Glide plates 66, 68, and 70 accordingly ride on an air cushion 80 that is formed by air escaping from the surfaces of air bearing member 32 and the respective guide plates. Each of the guide plates 66, 68, and 70 are affixed to carriage 36 by means of suitable adhesive 82. It should be appreciated by a skilled person in this field that other structures would be acceptable for carriage 36 so long as the carriage floats relative to air bearing member 32 for reciprocal movement along a translational axis.

As is further illustrated in FIGS. 5 and 6, an electrical harness 84 is provided to carry the necessary electrical leads for transducer 40 as well as power leads 86 for coil 44. In this manner, transducer 40 may be instructed to place information on a recording medium or retrieve information from the recording medium. If carriage 36 is constructed of a lightweight insulating material such as Bakelite, the electrical leads may be mounted directly on the carriage without the need for a harness. This potentially can reduce the weight and therefore increase the performance of the transducer head assembly.

Power leads 86 provide electrical current coil 44 to act as a drive that is operative to reciprocate carriage 36 that is that the changes in current will cause carriage 36 to move upwardly or downwardly as a result of the electromagnetic interaction with magnet 42. This sort of a drive is known in the art and may not be further explained. However, it should be appreciated at this juncture that other drives known in the art or hereafter developed may be incorporated into transducer head assembly 30 without departing from the scope of this invention. For example, and not by way of limitation, linear mechanical motors such as linear motors may be employed, if desired.

Figure 7:
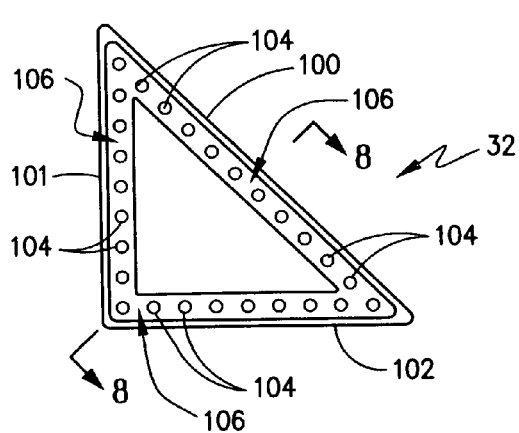
FIG. 7 is a bottom plan view of the air bearing guide used in the tape head assembly of FIGS. 2–6.
Figure 8:
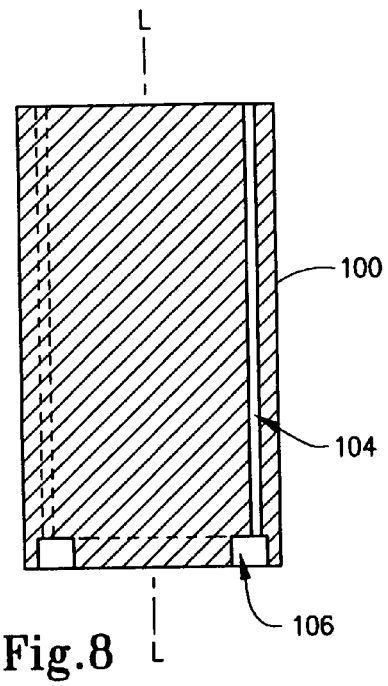
FIG. 8 is cross-sectional view taken about lines 8—8 of FIG. 7.

With reference to FIGS. 7 and 8, the structure of air bearing member 32 can be seen in greater detail. Here, it may be seen that air bearing member 32 is constructed so that at least a portion of the air bearing member provides a bearing surface constructed of porous material. The porous material may be selected from a group consisting of ceramics, metals and composite materials although in the embodiment shown in this application, the porous material is a ceramic material, such as alumina. This ceramic material may be impregnated with the selected adhesive, if desired, and this porous material has a porosity such that it is between 2 and 50 percent open. In FIGS. 7 and 8, air bearing member 32 is constructed entirely out of a porous ceramic material.

Moreover, as is shown in FIGS. 7 and 8, it may be seen that air bearing member 32 is formed as a triangular prism. By forming air bearing member 32 as a triangular prism and by providing carriage 36 with a geometrically similar triangular cavity, air bearing member 32 and carriage 36 are keyed to one another to prevent relative rotation about the translational axis. Since it is desired that rotation be prevented, air bearing member 32 could be generally in the shape of a prism having a cross-section in the shape of a polygon having n sides where n is an integer greater than 2. Any other non-circular shape would be acceptable although perhaps not as easy to construct as that described herein. Even a circular cross-section would be acceptable if proper keying were undertaken.

In the exemplary embodiment, air bearing 32 has a cross-section that is triangular and, indeed, is an isosceles right triangle (45/45/90 degree). In this manner, bearing member 32 has two sides 101 and 102 that are right angles to each other and a hypotenuse 100. Each of sides 101 and 102 form a 45 degree angle with hypotenuse 100. This shape may be very efficiently machined to exceedingly high precision. With this construction, the bearing surface area of air bearing member 32 extends completely around its perimeter with hypotenuse surface 100, side surface 101 and side surface 102 forming the bearing surfaces for the air bearing member 32.

Air bearing member 32 is substantially a solid piece of ceramic material. In order to provide air to the air bearing surfaces, however, at least one air distribution cavity is formed therein. While it would be possible to form the air distribution as a single large plenum centrally disposed and longitudinally extending through air bearing member 32, in the embodiment shown in FIGS. 7 and 8, a plurality of air distribution cavities are provided with these air distribution cavities each being formed generally as an elongated bore 104. Bores 104 are generally parallel with respect to one another and extend parallel to the longitudinal axis "L" of air bearing member 32. Each of bores 104 are dispersed in closely space relation and parallel to its respective hypotenuse surface 100, side surface 101 and side surface 102.

In order to provide uniform air pressure to each of the bores 104, a manifold in the form of a channel 106 extends around a base end 108 air bearing member 32 such that, when mounted on base 34, channel 106 communicates with outlet port 78 so that air from source 74 supplied by conduit 76 and inlet passageway 72 is introduced into channel 106 that is in fluid communication with each of bores 104. Cover plate 46 is provided to feel the opposite ends of each bore 104 at opposite end 110 of air bearing member 32 that is opposite base end 108. This is accomplished when cover plate 46 and air bearing member 32 are mounted on base 34 by means of mounting screw 48.

Naturally, it should be appreciated that the exact structure of air bearing member 32 could be modified without departing from the essence of this invention. For example, bores 104 could be formed so as not to extend entirely through the air bearing member eliminating the necessity of cover plate 46. Here, end 110 might be sealed by a sealing coating, such as a paint seal or otherwise. Moreover, portions of surfaces 100, 101 and 102 could be sealed, if desired.

Figure 10:
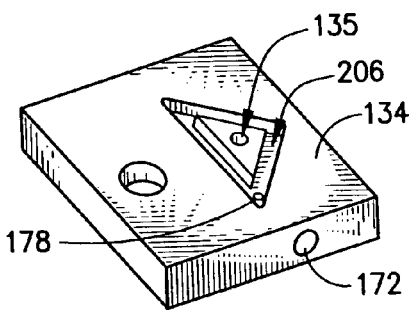
FIG. 10 is a perspective view of an alternative manifold structure that may be used with the air bearing of the present invention.

A different manifold structure could be provided instead of channel 106. For example, as is shown in FIG. 10, a base member 134, which could again be part of the support framework of the tape transport apparatus could be provided with a channel 206. Here, inlet passage 172 communicates with an outlet port 178 that is located within channel 206. An air bearing member such as air bearing member 32 omitting channel 106 but including bores 104 could then be mounted over channel 206 on base 134 by means of threaded opening 135 so that channel 206 is in fluid communication with each of the bores 104. Channel 206 then provides a manifold for such air bearing without the manifold being formed in base end 108.

Another alternative manifold could be provided by using a spacer structure that provides a manifold with the spacer being interposed between the framework and the air bearing member. Thus, when reference is made herein and in the claims to a "manifold" is should be understood that any of these structures or other structures apparent to the ordinarily skilled person in this field should be included within the definition of the manifold. Likewise, the term "air distribution cavity" should be interpreted to mean any passageway for conducting air (or other gas) so as to create the air bearing for the carriage.

Figure 9:
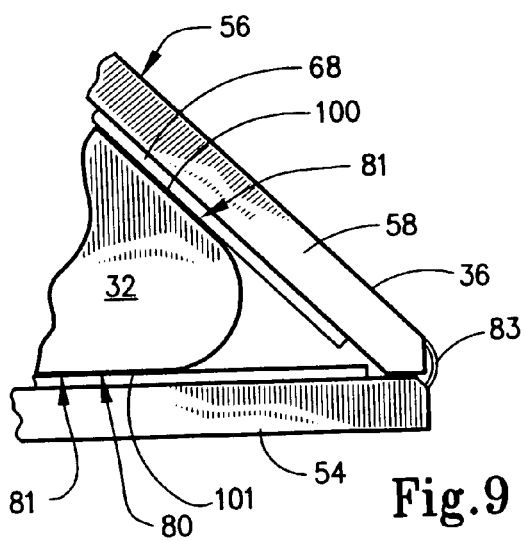
FIG. 9 is an enlarged view, broken away, showing the interfacing of the carriage and air bearing of the tape drive assembly of FIGS. 2–6 at a corner of the air bearing.

Turning now to FIGS. 4, 5 and 9, it should be understood that carriage 36 and air bearing member 32 are constructed with very high precision. To mate a carriage 36 with an air bearing member 32, air bearing member 32 is machined with high precision in a triangular shape described above. Air bearing member 32 is mounted on base 34 by means of cover plate 46 and mounting screw 48 and a reverse pressure is applied to inlet passageway 72. Air is then being drawn from the environment internally into air bearing member 32. At this point, guide plates 66 and 68 are suction adhered to side surfaces 101 and 102, and a thin high precision shim is interposed between guide plate 70 and hypotenuses surface 100 so that guide plate 70 is also held stationary relative to surface 100 with such shim in position.

While vacuum is applied, carriage piece 52 is placed over guide plates 66 and 68 so that guide plate 66 confronts the inner surface of wing 56 and guide plate 68 confronts the interior surface of wing 58. Guide plate 66 and 68 are adhered, respectively, to carriage piece 52. To facilitate this, wings 56 and 58 include x-shaped webs 57 and 59, respectively, and adhesive is applied at 82, as is shown in FIG. 5 for illustration. Similarly, carriage piece 54 has x-shaped webbings 59 which may be adhered to guide plate 70. Finally, while vacuum is still being applied, carriage pieces 52 and 54 are adhered to each other by adhesive 83 as is shown in FIG. 9. When the adhesive has cured, the shim that is previously been interposed between guide plate 70 and air bearing member 32 is removed. By removing the shim, a small gap 81 is created that is a fraction of the thickness of the shim with this gap 81 providing a region for air cushion 80.

With reference again to the figures, it should thus be appreciated that carriage 36 includes a frame formed by carriage pieces 54 and 56. While in the figures, this frame extends completely around the air bearing member 32 it might be possible to construct an air bearing member and a carriage such that the frame does not extend completely there around. However, it is desirable that the frame extend at least a majority around the air bearing to prevent it from becoming radially removed after the carriage is telescopically received on the air bearing member.

Figure 12:
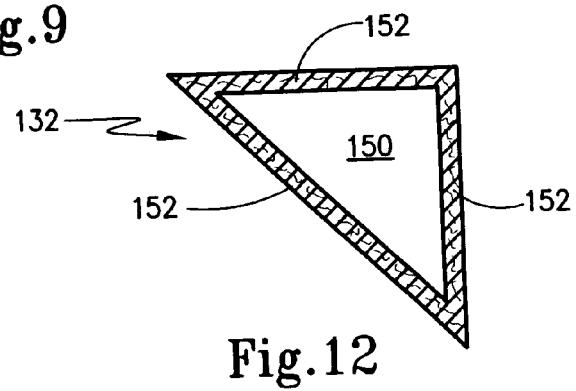
FIG. 12 is a cross-sectional view taken about lines 12—12 of FIG. 11.
Figure 11:
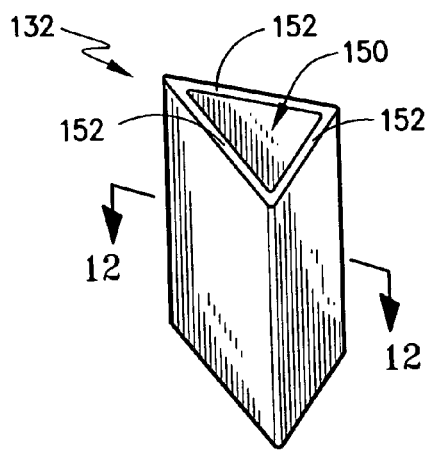
FIG. 11 is a perspective view of an alternative air bearing guide for use in the tape head assembly of FIGS. 2–6.

As noted above, it is possible to construct the air bearing member so as to have a single plenum for air pressure. Thus, as is shown in FIGS. 11 and 12, air bearing member 132 is constructed of the same geometric shape as air bearing 32. Here, however, a single plenum 150 is formed to define an interior 150 for air bearing member 132 such that air bearing member 132 has a surrounding sidewall 152 of substantially uniform thickness. This thickness may, for example, be on the order of 0.040 to 0.100 inches thick where the porous material is alumina.

Figure 13:
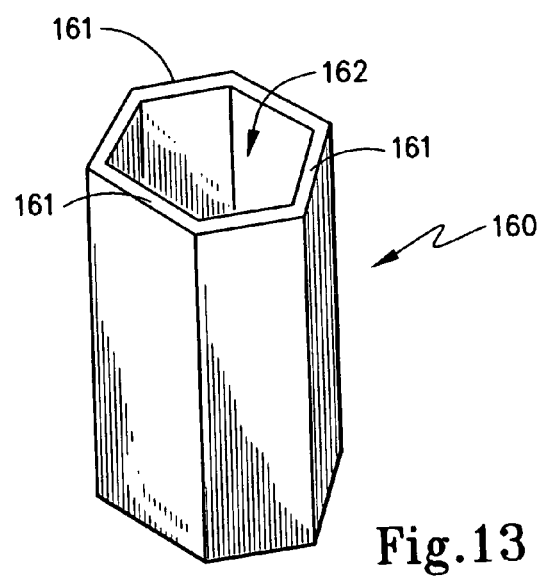
FIG. 13 is a perspective view of another alternative air bearing guide for use in a tape head assembly of the present invention.

Also, as noted above, it is possible to construct the air bearing member to have a different geometry than as the isosceles right triangle discussed above. Accordingly, and to illustrate another possible configuration, FIG. 13 shows an air bearing member 160 formed with a hexagonal cross-section. Here, also, air bearing member 160 has a single plenum 162 defining an interior surrounded by a side wall 161.

While the above-described description illustrates a possible embodiment of the present invention with a single transducer, it is possible to gang a pair of air bearing members and a pair of carriages together so that two transducers may interact with the tape medium. Accordingly, with reference to FIGS. 14–16, it may be seen that a second embodiment of the present invention includes a pair of air bearing members 232 that are supported in an upright state on a base 234. Bearing members 232 are held in position in a manner similar to that described above utilizing cover plates 246 and mounting screws 248. An upright magnet 242 is also supported in parallel relation to air bearing members 232 as was the case in the first exemplary embodiment.

Figure 15:
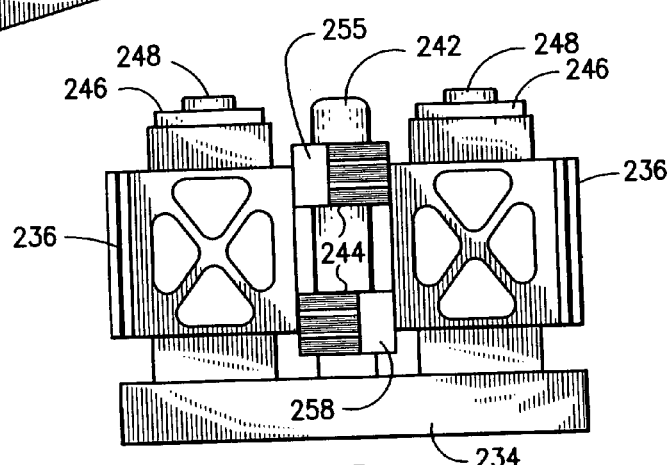
FIG. 15 is a rear view in elevation of the tape head assembly shown in FIG. 14.
Figure 16:
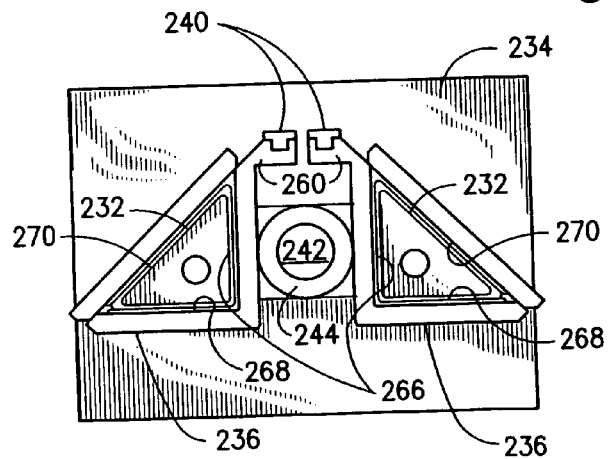
FIG. 16 is top plan view of the tape head assembly shown in FIGS. 14 and 15.
Figure 17:
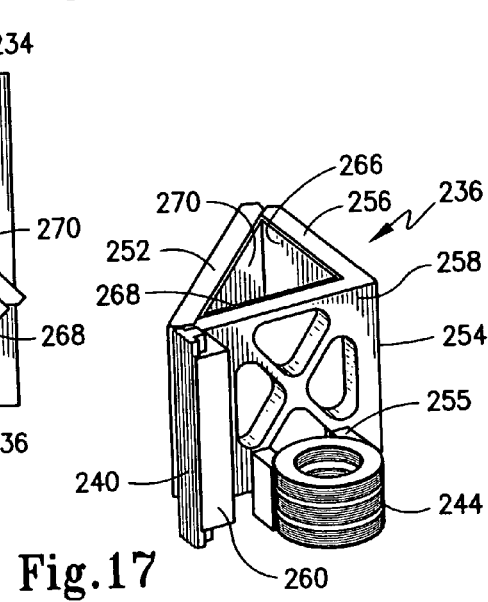
FIG. 17 is a perspective view of the carriage used with the tape head assemblies of FIGS. 2–6, 11–12 and 14–16.

Each air bearing member supports a carriage 236 for reciprocal motion thereon. A representative carriage is shown in FIG. 17 and is constructed substantially similar to carriage 36 but does have some variation therefrom. In the carriage 236, as is shown in FIGS. 14–17 includes a first carriage piece 252 and a second carriage piece 254 with carriage piece 254 being formed by a pair of wings 256 and 258 formed at right angles to one another. Here, however, a mounting bracket 255 is formed on wing 258 of second carriage piece 254 instead of being formed on carriage piece 252. Bracket 255 again supports a coil 244 with coil 244 being located at one end thereof. Likewise, second carriage piece 254 provides a cradle 260 that mounts a transducer 240 thereto.

Figure 14:
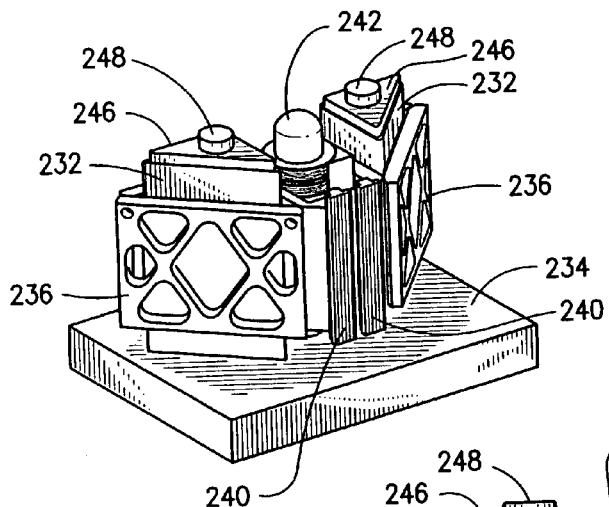
FIG. 14 is a front view in perspective showing an alternative embodiment of the tape head assembly of the present invention incorporating a pair of transducers.

A pair of guide plates 266 and 268 are respectively secured to the wings 256 and 258 of second carriage piece 254, and a guide plate 270 is secured to first carriage piece 252. A carriage piece 236 may now be supported on each air bearing member 232 as is shown in FIGS. 14–16 here it should be appreciated that in order to accommodate two such carriages utilizing a single drive magnet 242, it is necessary that one carriage piece 236 be inverted with respect to the other carriage piece so that the coils 244 are spaced apart from one another as is shown in FIG. 12. Accordingly, each carriage piece 236 may be independently driven on it respective air bearing member 232 by the variable electrical current that is supplied to its respective coil 244. With reference to FIGS. 11 and 13, it should be understood that this mounting places each transducer 240 in closely spaced parallel relation to one another so that they may be placed in proximity to the tape medium. Such arrangement can double the capacity of the read/write operation employing the two transducers.

Based on the foregoing, it should be understood that the present invention includes a transducer head assembly as well as a read/write transport apparatus incorporating the transducer head assembly an improvement thereto. Furthermore, it should be understood that the present invention contemplates a method that is inherent in the above-described structure and operation of such structure.

As such, this disclosure teaches a method of supporting a transducer head assembly and a method of transferring data between the tape medium and a transducer head assembly in a read/write application. Broadly, the method of supporting a transducer head assembly that is adapted for use in a read write application includes a step of providing an air bearing member having a bearing surface area. A transducer is then supported on the air-bearing member in a manner such that it can reciprocate with respect to the bearing surface area. The method described according to the exemplary embodiment flows air (or other gas) out of the bearing surface area so that the transducer is floatably supported on a resulting air cushion. The transducer is then reciprocated in a controlled manner while the transducer is floatably supporting on the air cushion.

In the exemplary embodiment, the step of supporting the transducer on the air-bearing member is accomplished by disposing the transducer on a carriage. This carriage is then floatably supported on the air cushion. The step of reciprocating the transducer is then accomplished by reciprocating the carriage. In further detail, the exemplary embodiment includes configuring the air bearing and the carriage such they are keyed with respect to one another so as to resist relative rotation while being reciprocated. Here, in the exemplary embodiment, the air bearing member is formed generally in the shape of a prism having a cross-section the shape of a polygon with n-sides wherein n is an integer greater than 2 and wherein the carriage has a cross-section in a shape that is generally geometrically similar to and slightly larger than the cross-section of the polygon. The carriage may include a frame extending around a majority of the air bearing and, in the disclosed embodiment, the frame extends completely around the air bearing.

The air bearing is disclosed to be a porous ceramic air-bearing member which in the exemplary embodiment, has a plurality of sides. Thus, the bearing surface includes a plurality of sides of the air-bearing member. The step of reciprocating the transducer is accomplished electromagnetically. Here, an electromagnetic coil is mechanically secured to the transducer, such as by securing it to the carriage.

The method of supporting a transducer head assembly may be used in a read/write application, then, where a tape medium is transported across a transducer region in a transport direction such that the tape medium is proximate to the transducer. The transducer is then used to either write data on the tape medium or to read data from the tape medium as it is transported across the transducer region. The transducer is reciprocated along the translational axis that, in the disclosed embodiment, is oriented generally transversely to the transport direction of the tape medium.

Accordingly, the embodiments of the present invention have been described with some degree of particularity. Accordingly, modifications or changes may be made to the exemplary embodiments of the present invention without departing from the concepts contained herein.

We claim:

1. A method of supporting a transducer head assembly adapted for use in a read/write application, comprising:
   (A) providing an air bearing member having a bearing surface area;
   (B) supporting a transducer on the air bearing member in a manner such that it can reciprocate with respect to the bearing surface area;
   (C) flowing a gas out of the bearing surface area so that the transducer is floatably supported on a resulting air cushion; and
   (D) reciprocating said transducer in a controlled manner while said transducer is floatably supported on the air cushion.

2. The method according to claim 1 wherein the step of supporting said transducer on the air bearing member is accomplished by disposing said transducer on a carriage and floatably supporting said carriage on the air cushion and wherein the step of reciprocating said transducer is accomplished by reciprocating said carriage.

3. The method according to claim 2 including the step of configuring said air bearing and said carriage such that they are keyed with respect to one another so as to resist relative rotation while being reciprocated.

4. The method according to claim 2 wherein the step of providing an air bearing member is accomplished by providing such air bearing member generally in the shape of a prism having a cross section in the shape of a polygon with n sides wherein n is an integer greater than 2 and wherein the step of disposing said transducer on a carriage is accomplished by disposing said transducer on a carriage having a cross section in a shape that is generally geometrically similar to and slightly larger than the cross section of said polygon.

5. The method according to claim 4 wherein the step of providing an air bearing member is accomplished by providing such air bearing member with a bearing surface that includes a plurality of sides of said air bearing member.

6. The method according to claim 2 wherein the step of disposing said transducer on a carriage is accomplished by disposing said transducer on a carriage that includes a frame extending a majority around said air bearing.

7. The method according to claim 6 wherein the step of disposing said transducer on a carriage is accomplished by disposing said transducer on a frame that extends completely around said air bearing.

8. The method according to claim 1 wherein the step of providing an air bearing member is accomplished by providing a porous ceramic air bearing member.

9. The method according to claim 1 wherein the step of reciprocating said transducer is accomplished electromagnetically.

10. The method according to claim 9 including a step of providing an electromagnetic coil that is mechanically secured to said transducer and wherein the step of reciprocating said transducer is accomplished by electromagnetically reciprocating said electromagnetic coil.

11. A method of transferring data between a tape medium and a transducer head assembly in a read/write application, comprising:
  (A) providing an air bearing member wherein said air bearing member has a bearing surface area;
  (B) supporting a transducer on the air bearing member with said transducer being located in a transducer region in a manner such that it can reciprocate with respect to the bearing surface area;
  (C) flowing a gas out of the bearing surface area so that the transducer is floatably supported on a resulting air cushion;
  (D) transporting the tape medium across the transducer region in a transport direction such that the tape medium is proximate to said transducer;
  (E) reciprocating said transducer along a translational axis in a controlled manner while said transducer is floatably supported on the air cushion and while said tape medium is transported across the transducer region; and
  (G) using said transducer to either write data on the tape medium or to read data from the tape medium as it is transported across the transducer region.

12. The method according to claim 11 wherein the translational axis is oriented generally transversely to the transport direction.

13. The method according to claim 11 wherein the step of supporting said transducer on the air bearing member is accomplished by disposing said transducer on a carriage and floatably supporting said carriage on the air cushion and wherein the step of reciprocating said transducer is accomplished by reciprocating said carriage.

14. The method according to claim 13 including the step of configuring said air bearing and said carriage such that they are keyed with respect to one another so as to resist relative rotation while being reciprocated.

15. The method according to claim 13 wherein the step of providing an air bearing member is accomplished by providing such air bearing member generally in the shape of a prism having a cross section in the shape of a polygon with n sides wherein n is an integer greater than 2 and wherein the step of disposing said transducer on a carriage is accomplished by disposing said transducer on a carriage having a cross section in a shape that is generally geometrically similar to and slightly larger than the cross section of said polygon.

16. The method according to claim 13 wherein said carriage includes a frame extending a majority around said air bearing.

17. The method according to claim 11 wherein said air bearing is a porous ceramic air bearing member.

18. The method according to claim 11 wherein the step of reciprocating said transducer is accomplished electromagnetically.

* * * * *